(12) United States Patent
Wilson

(10) Patent No.: US 7,692,627 B2
(45) Date of Patent: Apr. 6, 2010

(54) SYSTEMS AND METHODS USING COMPUTER VISION AND CAPACITIVE SENSING FOR CURSOR CONTROL

(75) Inventor: Andrew D Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 10/914,923

(22) Filed: Aug. 10, 2004

(65) Prior Publication Data

US 2006/0033701 A1 Feb. 16, 2006

(51) Int. Cl.
G06G 5/00 (2006.01)

(52) U.S. Cl. ............... 345/156; 345/173; 178/18.06

(58) Field of Classification Search ........... 345/173, 345/156; 178/18.01, 18.06; 715/856, 863; 250/206.1, 216, 221; 382/291
See application file for complete search history.

(56) References Cited

U.S. PATENT DOCUMENTS

| | | | | |
|---|---|---|---|---|
| 5,317,140 | A * | 5/1994 | Dunthorn | 250/221 |
| 5,943,516 | A * | 8/1999 | Uchiyama et al. | 396/281 |
| 6,266,061 | B1 * | 7/2001 | Doi et al. | 715/863 |
| 6,954,197 | B2 * | 10/2005 | Morrison et al. | 345/158 |
| 7,030,860 | B1 * | 4/2006 | Hsu et al. | 345/173 |
| 7,058,204 | B2 * | 6/2006 | Hildreth et al. | 382/103 |
| 7,148,704 | B2 * | 12/2006 | Philipp | 324/686 |

OTHER PUBLICATIONS

Andrew Wilson, et al., GWindows: Robust Stereo Vision for Gesture-Based Control of Windows, ICMI'03, Nov. 5-7, 2003, 8 pages, Vancouver, British Columbia, Canada.
Ken Hinckley, et al., Touch-Sensing Input Devices, CHI '99, May 15-20, 1999, pp. 223-230, Pittsburgh, PA.
Ka-Ping Yee, Two Handed Interaction on a Tablet Display, CHI 2004, Apr. 24-29, 2004, pp. 1493-1496, Vienna, Austria.
Ken Hinckley, Synchronous Gestures for Multiple Persons and Computers, UIST '03, Nov. 2003, pp. 149-158, Vancouver, British Columbia, Canada.
Ken Hinckley, et al., Interaction and Modeling Techniques for Desktop Two-Handed Input, UIST '98, Nov. 1998, San Francisco, CA.
Andrew Wilson, et al., GWindows: Towards Robust Perception-Based UI, First IEEE Workshop on Computer Vision and Pattern Recognition for Human Computer Interaction, Jun. 2003.

* cited by examiner

Primary Examiner—Abbas I Abdulselam
(74) Attorney, Agent, or Firm—Lee & Hayes, PLLC

(57) ABSTRACT

Disclosed is a unique system and method that facilitates cursor control based in part on computer vision activated by a capacitive touch sensor. When turned on, user hand gestures or movements can be tracked by a monitoring component and those movements can be converted in real-time to control or drive cursor movements and/or position on a user interface. The system comprises a monitoring component or camera that can be activated by touch or pressure applied to a capacitive touch sensor. A circuit within the sensor determines when the user is touching a button (e.g., on keyboard or mouse) that activates the monitoring component and cursor control mechanism. Thus, intentional hand movements by the user can readily be determined.

27 Claims, 8 Drawing Sheets

SYSTEMS AND METHODS USING COMPUTER VISION AND CAPACITIVE SENSING FOR CURSOR CONTROL

TECHNICAL FIELD

The present invention relates generally to navigating in a two-dimensional space and in particular, to tracking hand motion and navigating through the two-dimensional space according to such hand motion.

BACKGROUND OF THE INVENTION

In the last decade, computer usage has increased exponentially. Such significant increases have given rise to a vast amount of new computing technologies that facilitate such activities as making telephone calls, video gaming between different computer users, publishing, and conducting business meetings. In addition, computer shapes and sizes have gone from large and bulky to smaller and sleeker designs. Some are in tablet-form or hand-held dimensions that allow data input via voice and/or hand-writing recognition. Thus, the overall computing experience continues to advance as consumers become more demanding and as their needs evolve.

More recently, further developments continue in the area of navigating through content. Much work has been done to find new ways of condensing less important material on screen while expanding other more important material. Different scrolling techniques have also been proposed using hard-wired and wireless pointing devices. In addition, numerous amounts of research have been conducted on the subject of applying computer vision and other sensing techniques to navigation devices. In general, this can involve sensing a user's action or movement to determine the user's desired viewing location or position. Thus, ascertaining the intent of a user's action can be determinative of one technique's success over another. Unfortunately, some previous proposals remain problematic and ineffective in distinguishing a user's intentional movement from an unintentional movement while others have difficulty in determining when the user's action is intentionally directed to the sensing system and not to some other task.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and/or methodology that facilitate vision-based cursor control. More specifically, the systems and/or methodologies involve driving cursor movement at least in part by detecting hand motion. The invention can be accomplished in part by employing at least one camera and at least one capacitive touch sensor arranged in a configuration that allows a mode-switch functionality to activate and deactivate vision-based cursor control.

According to one aspect of the invention, a capacitive sensor circuit can be located or affixed to the surface of an input device (e.g., mouse buttons) and operatively connected to the one or more cameras positioned over the input devices (e.g., keyboard, mouse, and/or touchpad). When touched for any length of time, the capacitive sensor circuit can provide a measurement corresponding to the discharge time of the capacitor. This measurement can relate to an amount of touch. When the amount of touch satisfies a threshold value, the capacitive sensor circuit can signal the one or more cameras to turn on to begin watching for any hand motion. The capacitive sensor circuit constantly charges and discharges. Thus, it can continuously calculate discharge times to determine whether at any given moment, the amount of touch no longer satisfies the threshold. When this occurs, the camera can be signaled to turn off to stop the vision-based cursor control.

According to another aspect of the invention, flow fields can be employed to compute relative motion of a user's hand (s). In particular, flow fields can be computed on the image in real time. Rather than tracking the hand, they can average vectors to obtain a summary vector which is a smoother and more stable estimate of all the little noisy estimates. Block matching can be employed to compute the flow fields to facilitate determining the hand's (at least one) relative motion in real time.

In addition to determining the relative position of a user's hands, the absolute position of a user's hands can be determined as well. This can be accomplished at least in part by averaging the spatial positions of substantially all non-zero vectors. Absolute position may be desired for more intricate control of the cursor position.

According to still another aspect, the systems and methods of the present invention can facilitate gesture recognition by way of a "push to gesture" signal. "Push to gesture" can refer to conveying or expressing a movement by the touch of a button. For example, when a special button or control is pushed, a user's hand gestures can be used to control or move a cursor on a screen. In addition to movement, the invention can also be sensitive to the speed of movements detected. Furthermore, a plurality of hand motions can be configured as distinct signals for particular commands such as pan, enlarge view, contract view, "next page", faster scroll, slower scroll, first page, last page, etc.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
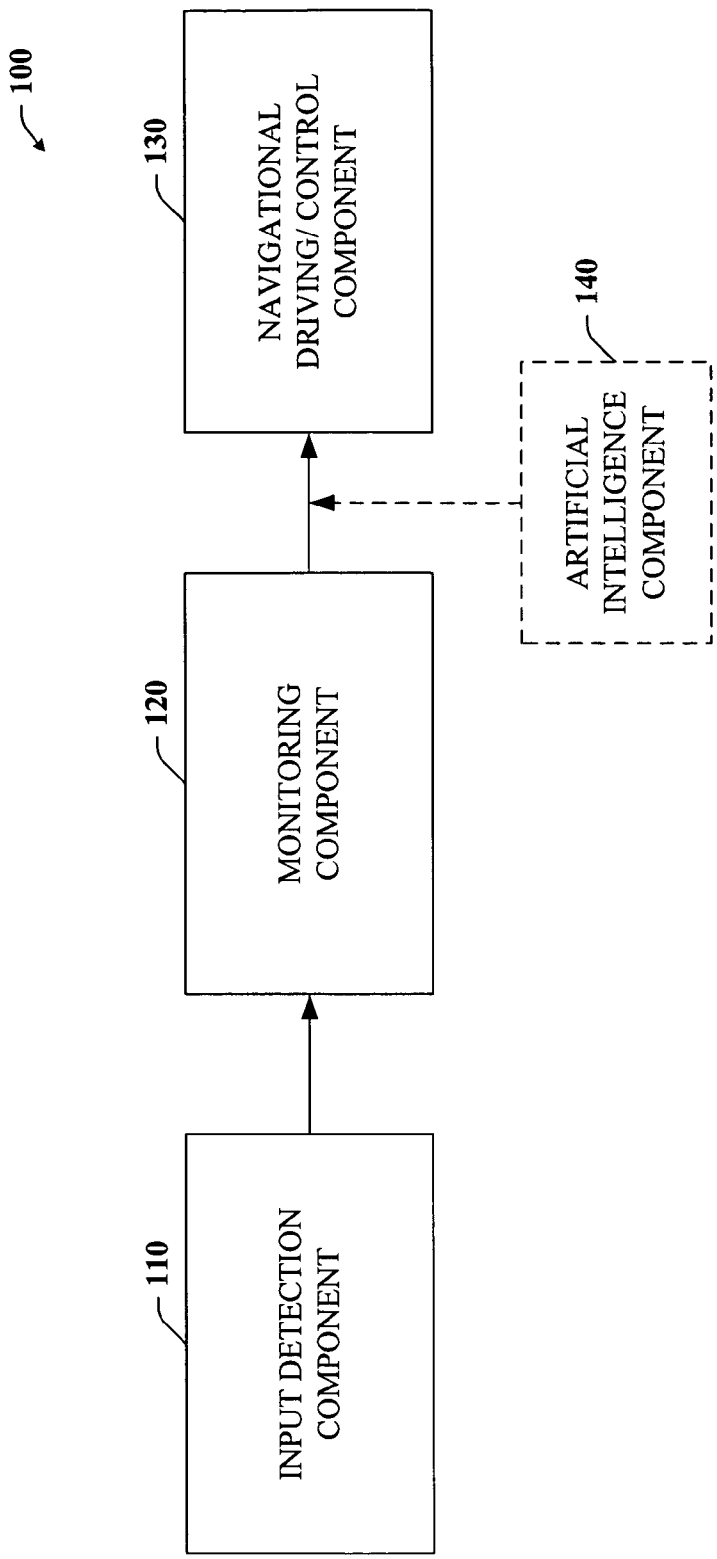
FIG. 1 is a high level, block diagram of a vision-based navigation control system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with employing vision to control cursor-based navigation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is a general block diagram of a vision-based navigation control system 100 that facilitates viewing desired portions of content in accordance with an aspect of the present invention. The system 100 comprises an input detection component 110 that can detect user-based input such as a touch or some amount of pressure applied to an input component (not shown). Examples of the input component include but are not limited to a button associated with a mouse and/or a touchpad, one or more keys of a keyboard, and the like. The user-based input can be converted to an electrical signal that is sensed by the detection component 110. The detection component 110 can be operatively connected to a monitoring component 120 for communication purposes. In particular, when the detection component 110 detects input, that input or its related data can be communicated to a monitoring component 120. Upon receipt of the data, the monitoring can be activated or turned on.

By way of example, imagine that the detection component 110 comprises a capacitive touch sensor circuit which is constantly discharging and charging. The capacitive touch sensor circuit can include a copper plate or other metallic material which functions as an electrode. The electrode can be applied to any desirable surface such as a button located on the input component. Software on a host can read the status or touch state of the circuit. When contacted by a user, a calculation can be performed within the circuit to obtain a numerical value to determine whether the user's contact is sufficient to change the status or touch state of the circuit. The monitoring component 120 which comprises one or more cameras positioned to monitor the user's "visible" hand movements can be turned on or off depending on the state of the circuit. Alternatively, the monitoring component 120 can receive the circuit's calculated reading (e.g., numerical value) and determine whether the data received from the circuit is sufficient to activate itself.

Once the monitoring component is activated, the monitoring component 120 can begin monitoring movements and/or motion that occurs within its viewable space. The motion of a user's hand, for example, can be broken down into a plurality of images or frames taken sequentially at various times such as $t_{-2}$, $t_{-1}$, t, etc., whereby t can represent the current image or frame. Each frame captured at the various times can be compared to one another and averaged to determine a relative position of the user's hand. The relative position of the user's hand can then be used to navigate the user through content. In particular, image related data corresponding to the user's hand motion generated by the monitoring component 120 can be communicated to a navigational driving/control component 130 in real time. Based at least in part on the image data, the navigation control component 130 can navigate the user to its desired position of the content.

Thus, in practice, as hand movements associated with moving through content such as a scrolling operation are watched by a camera, the navigational driving/control component 130 can respond in real time to essentially scroll the content for the user until the user's hand movements corresponding to scrolling stop or are no longer "seen" by the camera. Navigation through the content can begin immediately again according to the user's hand movements. However, when the user desires to "turn off" the navigation, the user can simply terminate contact with the detection component 110. This effectively stops the signal to the monitoring component 120 and the monitoring component 120 essentially turns off as well for purposes of driving the navigational driving component 130.

The system 100 can also comprise an optional artificial intelligence component 140 to facilitate inferring a user's movements based on extrinsic information, state information, context information, historical information or other learned behavior. For example, a sequence of movements can be learned to drive a cursor to a desired position or page without requiring the user to perform every precise motion. In addition, some movements can be learned with respect to the type of content being viewed. By way of example, consider that a user may navigate through web content in a different manner or at a different speed than a word processor document. Furthermore, images or other content presented in a slide show format can be viewed differently than text documents.

Accordingly, various artificial intelligence based schemes can be employed for carrying out various aspects of the subject invention. For example, gesture recognition can be facilitated via an automatic identification or classification system and process. Such identification or classification of gestures and/or other movements or motion can employ a probabilistic and/or statistical-based analysis (e.g., factoring into the analysis utilities and costs) to prognose, determine and/or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

Moreover, using the camera(s) to track the user's hand movements is essentially a deviceless interaction because the user is not required to hold any type of device such as a mouse or stylus to navigate through the content. The figures which follow below provide further insight into this exemplary deviceless interaction.

Figure 2:
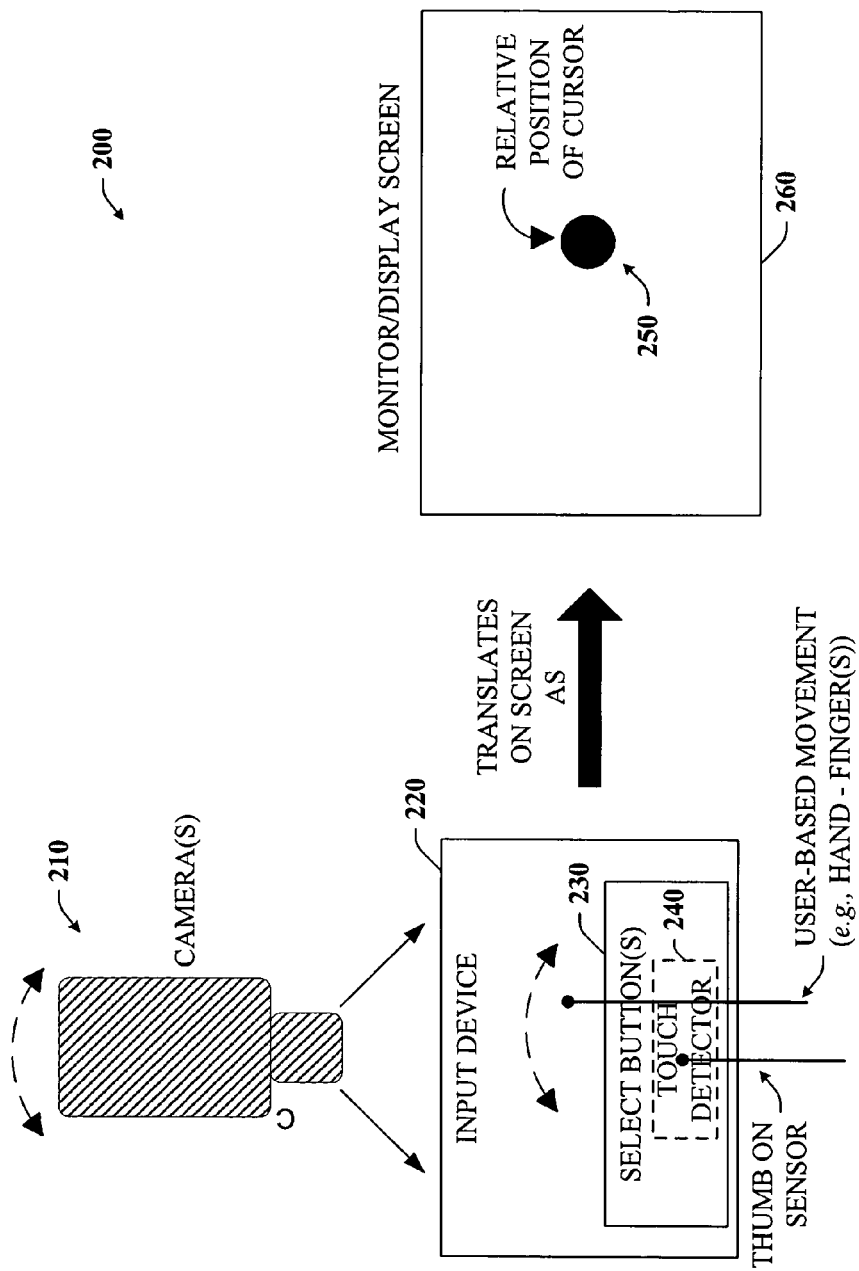
FIG. 2 is a schematic block diagram of a vision-based cursor navigation system in accordance with another aspect of the present invention.

Referring now to FIG. 2, there is illustrated a schematic diagram of a vision-based cursor control system 200 in accordance with an aspect of the present invention. The system 200 comprises one or more cameras 210 located over at least one input device 220. The input device 220 can include a keyboard and/or a touchpad located in close proximity of the keyboard.

As depicted in the figure, the camera 210 can move (in any direction) within a set range to watch any movements or motion occurring within its sight span when in an "on" state. The input device 220 can also comprise one or more select buttons 230 such as those associated with a touchpad, for example. Regarding a touchpad, these buttons 230 can be referred to as a left and/or right touchpad or on-board mouse buttons.

A touch detector 240 or capacitive touch sensor can be applied to the surface of at least one of the select buttons 230. For example, most users program a left touchpad button as a "select" button. Thus, a user can naturally enable the vision-based cursor control by resting the left thumb on the left button (e.g., in the case of right-hand dominant users) in preparation for a left-button click. While touching the left button, the user can control the cursor by moving his/her hand(s) directly above the keyboard and in the view of the camera 210. Such hand movements can be converted in real time to provide a relative position of the cursor 250 on content displayed on a display screen 260 (e.g., computer monitor). It should be appreciated that the converse can be applied as well for left-hand dominant users.

By limiting the interaction space to just above the keyboard, the user can quickly switch from typing to cursor control and drive the cursor with minimal arm fatigue. Alternatively, the interaction space can be defined otherwise as desired by the user and such is contemplated to fall within the scope of the present invention.

Because the touch sensor is functionally linked to the operation of the camera 210, the touch sensor can also be employed to adjust the brightness of the screen to provide an optimal amount of illumination for the camera 210. This can be particularly useful to laptop computer users. In most cases, laptop screens dim when the computer operates on battery power alone to primarily conserve battery life. However, the dimness, though sometimes slight, can potentially affect the camera's ability to accurately view and capture the user's hand movements. Though not depicted in the figure, the touch sensor can communicate with the screen and battery components when "touched" to temporarily increase the illumination of the screen while the camera 210 is activated. When the camera 210 is disabled or disengaged, the screen returns to its previous illumination state. In addition or in the alternative, an infrared LED (not shown) can be added onto the camera 210. The LED would have the added benefit of being invisible to the user and not washing out the display. Thus, cursor control is optimized without unduly wasting valuable battery life.

Figure 3:
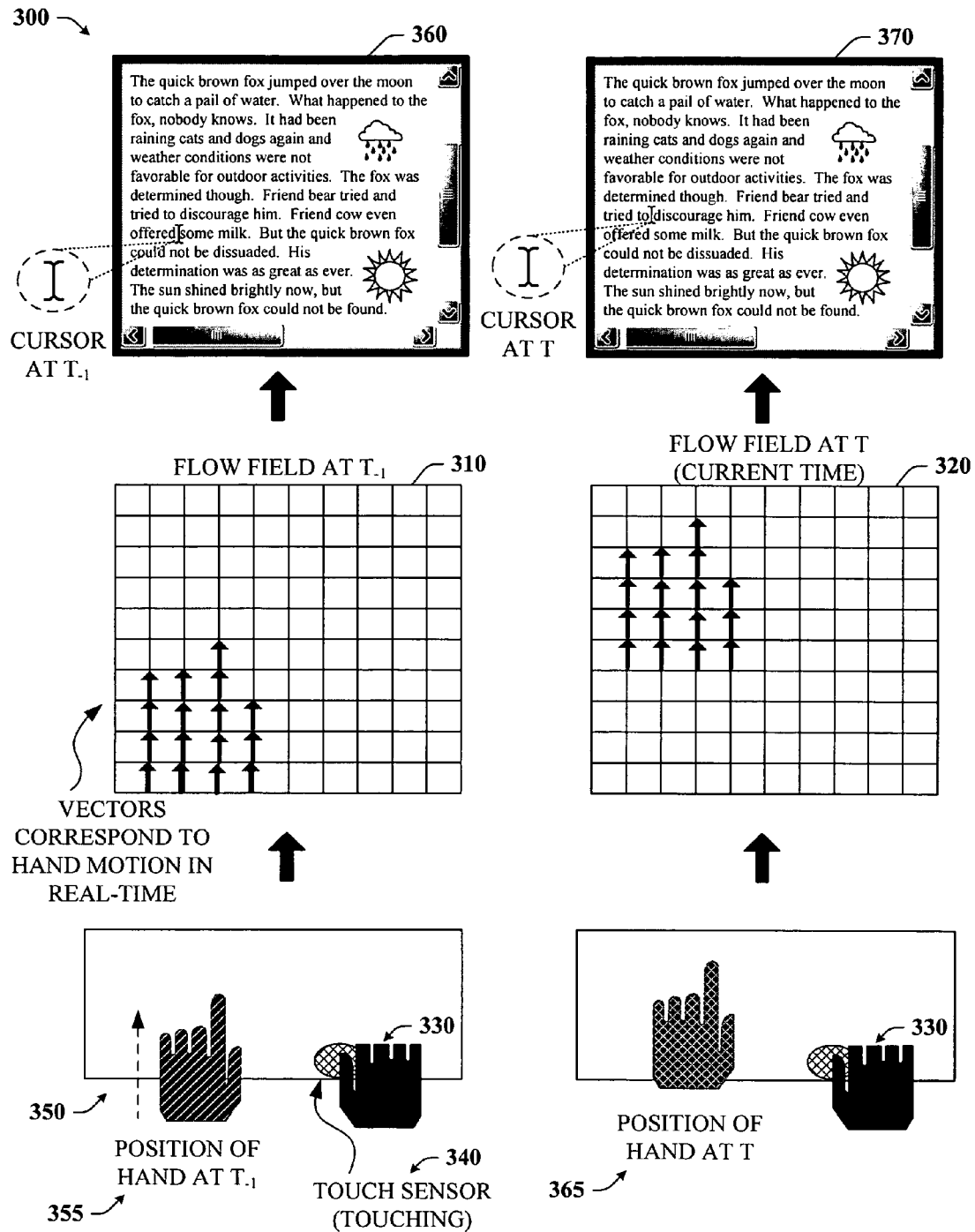
FIG. 3 is a schematic block diagram demonstrating the generation of flow fields computed on images captured by a monitoring component in accordance with yet another aspect of the present invention.

Turning now to FIG. 3, there is illustrated a diagram demonstrating an exemplary scheme 300 to track hand movements using vision-based control. In particular, the process involves acquiring frames of an image from one or more cameras (e.g., camera 210 in FIG. 2) and then generating flow fields based on the acquired frames in real-time. For example, a flow field at $T_{-1}$ 310 can be generated based on the corresponding frame captured by the camera at time $T_{-1}$. Another flow field at T 320 can be subsequently generated to correspond to the frame captured by the camera at a current time T.

In practice, imagine that a user 330 touches a touch sensor 340 with the left thumb of his right hand. As a result of the amount of pressure applied or the duration of the touch, the camera turns on and begins watching the user's hand movements (e.g., left hand motion 350). Hand movements include up, down, left, right as well as rotational movements. As frames are captured by the camera, corresponding flow fields (e.g., 310 and 320) can be generated or computed on the relevant image for each frame in real time in part by employing SSE2 (Streaming SIMD Extensions 2) technologies. SSE2 allows the computations to occur rapidly and in succession so that there is substantially no time delay between capturing the user's movements and controlling the cursor accordingly.

Each flow field includes a grid overlay comprising a plurality of blocks. The relevant frame or image captured by the camera is converted into a series of dots or points placed on the grid such that each block may or may not include one or more points of the image. A sequence of flow fields can be computed by a block matching technique to obtain a plurality of vectors corresponding to the directional movement of the image from frame to frame. The vectors can then be averaged to yield a summary vector which can be characterized as a smooth, stable estimate of all of the smaller noisy estimates. For example, in a rotation of the hand, the vectors can be seen to form concentric circles over time.

In practice, for example, consider the following: after the flow field is computed, for each location i on the grid, there is dx_i, dy_i, which is the result of the block matching algorithm at that point (how far did the block matching algorithm have to move the block in order to find the best match). Following, take all the dx_i, dy_i for which norm([dx_i dy_i]) is greater than some threshold (near zero) and average them to obtain a mean dx, dy. The position of the cursor is set to x'=x+dx, y'=y+dy, where (x, y) is the current position of the cursor, and (x', y') is the updated position of the cursor. Note that this is a relative positioning scheme for controlling the cursor, which supports "clutching" by letting off the "push to gesture" switch (button), moving your hand, then re-engaging "push to gesture".

As can be seen in the figure, the user's upward hand movement 355 is captured at time $T_{-1}$, which correlates to moving or positioning the cursor between the words "offered" and "some" on content displayed on a screen/user interface 360. Though not illustrated, several intermediate flow fields may be computed to account for the precise shift of the user's hand from $T_{-1}$ to T (365). At time T, the user's hand movements now position the cursor between the words "to" and "discourage" (370)—upward relative from its previous position at $T_{-1}$. Hence, by allowing the camera to capture hand motions and by subsequently recognizing particular gestures, the cursor can be moved about a display screen to facilitate browsing through content.

Gesture recognition can be modeled and then applied to other applications to facilitate navigating through or viewing content. For instance, one hand or finger rotation can result in an expansion or contraction about a point and provide an outcome similar to a 3-dimensional effect. Additionally, navigation or cursor control can be speed sensitive. Thus, a user can toggle a touchpad or mouse acceleration profile depending on the position or motion of the hand to adjust the speed of the cursor or navigation tool. This can be particularly pertinent to scrolling and/or panning operations (e.g., up, down, left, right, orthogonal, movement along z-axis, etc.).

Furthermore, the amount of motion (spatial) extent can be used to control the amount of cursor (mouse) acceleration. In practice, large spatial extent can indicate large cursor motion, while small spatial extent can move the cursor slowly for more precise selection. Also, large spatial extent can indicate that the whole hand is being used, in which case it might be appropriate for the application to select the panning tool (e.g., hand icon) to scroll in an image editing application, a large spreadsheet, or a map, for example. In addition, some hand movements can be defined or learned to indicate next page, previous page, first page, last page, end of page, beginning of page, etc.

If it is desired to estimate an amount of movement under the image, the number of blocks for which the vector is nonzero can be counted. Moreover, the relative position of a user's hand, for example, can be employed to visually control a cursor's location. Thus, measurements such as dx (left-right directional changes), dy (up-down directional changes), dz (depth changes), and/or dθ (rotation changes) values can be obtained. Alternatively, absolute position can be obtained. This can be accomplished in part by averaging the spatial positions of all nonzero vectors.

Though not depicted in the figure, a two-hand variation for cursor control is also feasible. Rather than tracking both hands, a clustering operation on the flow field vectors can be performed. As a result of such an operation, two independent motions observed by the two hands, respectively, can be discarded. Hence, the fact that each hand typically moves about any single object with different or mirror-image-like movements (e.g., from a left hand perspective and a right hand perspective) can be utilized in determining at least the relative position of the two hands.

Figure 4:
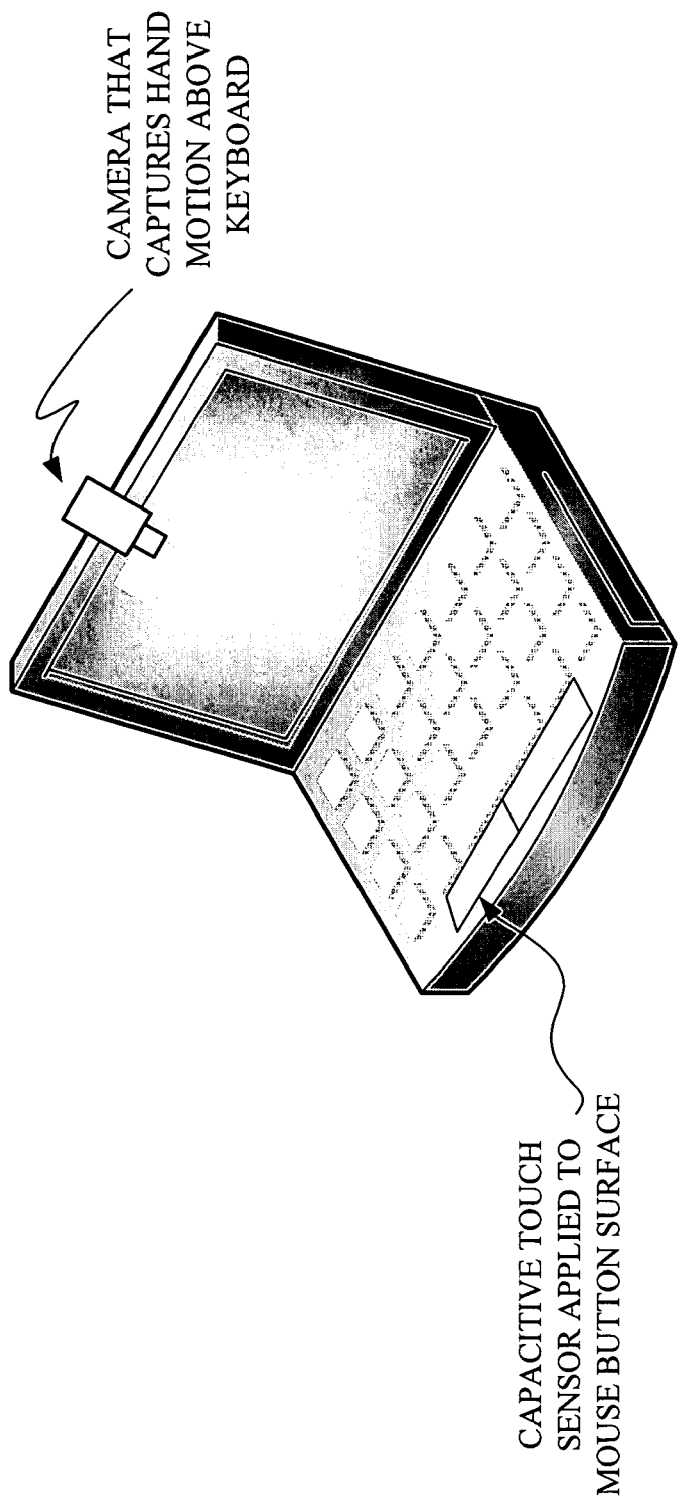
FIG. 4 is a depiction of an exemplary vision-based cursor control system as employed on a laptop computer in accordance with still another aspect of the present invention.

Turning now to FIG. 4, there is illustrated a schematic diagram of an exemplary computer arrangement 400 to facilitate vision-based cursor control. The arrangement 400 comprises a laptop computer 410 having at least one camera 420 attached to the display portion 430 of the laptop computer 410. The camera 420 can be positioned in a downward direction over the keyboard portion 440 of the laptop computer 410 to watch the scene over the keyboard portion 440. The laptop computer 410 also comprises a capacitive touch sensor circuit 450 applied to the upper surface of at least one key or button on the laptop computer 410. When touched by the user, the circuit can send an appropriate signal to the camera 420 informing it to turn on and begin capturing frames of any movements it sees. Likewise, when not touched by the user, the circuit's signal to the camera terminates and the camera stops capturing frames.

Recall that the circuit communication to the camera can operate in part by a touch threshold. In some cases, the threshold and/or the touch sensor circuit may need to be reset or modified according to user preferences. This can be accomplished at least in part by simply touching the circuit for a specified amount of time or until it indicates that it has been reset (e.g., indicator light on or off screen or sound). Although this aspect of the invention has been described with respect to a laptop computer, it is to be appreciated that any suitable computing device (e.g., PDA, cellular phone, desktop computer, interactive television, etc.) can be employed in connection with the subject invention.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 5:
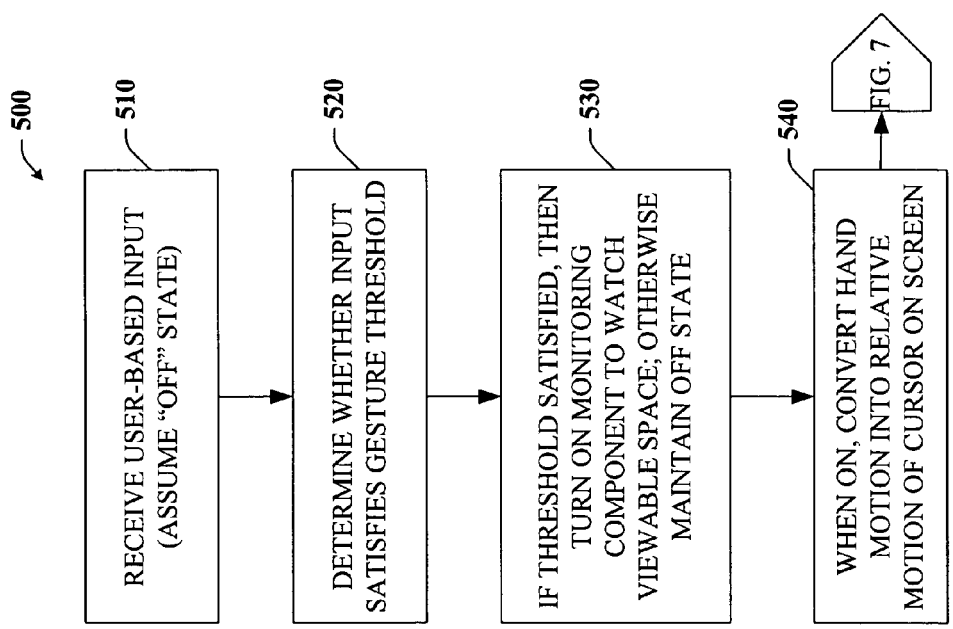
FIG. 5 is a flow diagram of an exemplary process that facilitates vision-based control in accordance with an aspect of the present invention.

Referring now to FIG. 5, there is illustrated a flow diagram of an exemplary navigation process 500 that facilitates vision-based cursor control in accordance with an aspect of the present invention. Assuming that the system or process is currently in an "off" state, the process 500 comprises receiving user-based input at 510. The input can be in the form of touch or other detectable gesture that can be sensed by the process 500. At 520, the process 500 can determine whether the input satisfies a gesture threshold. If satisfied, then a monitoring component can be signaled to an "on" state at 530—otherwise, the "off" state is maintained. When in the "on" state, the monitoring component can detect and employ hand motions by the user to control the cursor on screen. Thereafter, the process 500 can proceed as demonstrated in FIG. 7, infra.

Figure 6:
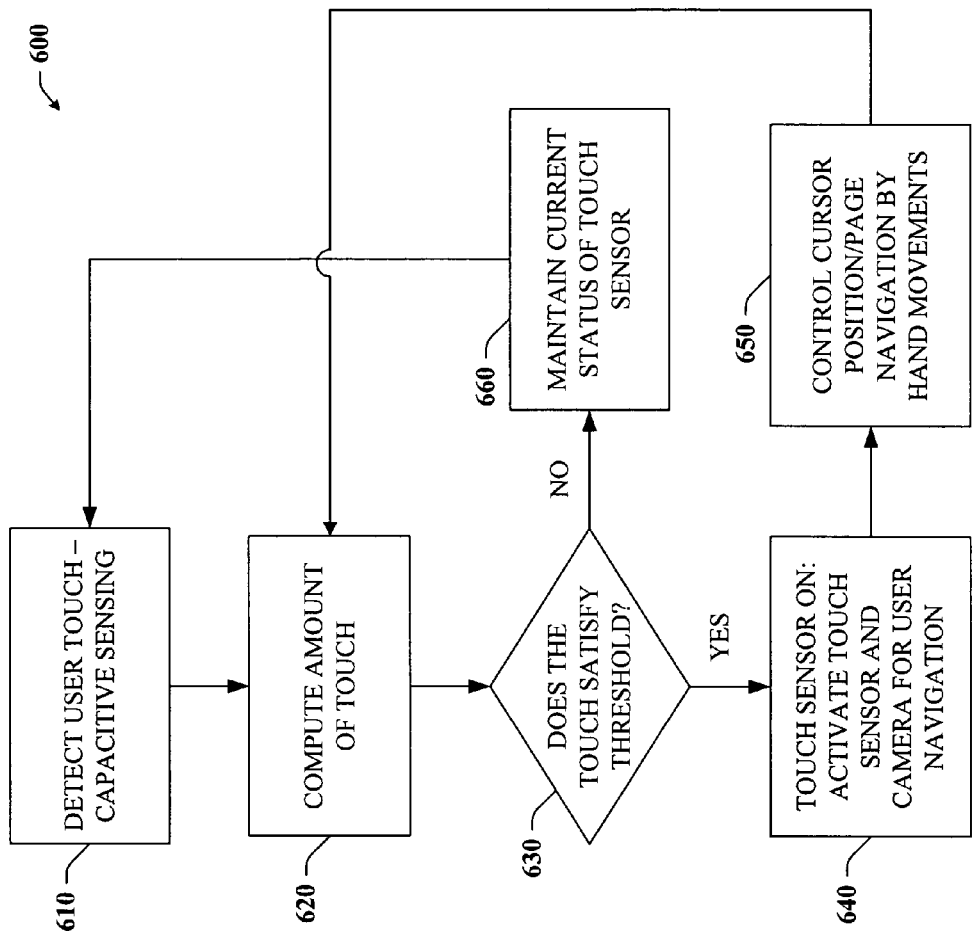
FIG. 6 is a flow diagram illustrating an exemplary process that facilitates vision-based control in accordance with an aspect of the present invention.

Referring now to FIG. 6, there is illustrated a diagram demonstrating an exemplary pathway 600 that can be taken to facilitate driving and/or control a cursor by motion. The pathway 600 can begin at 610 by detecting user touch via capacitive sensing (capacitive touch sensor). At 620, the amount of touch detected can be computed to determine if it satisfies a touch threshold at 630. If the detected amount of touch does not satisfy the threshold, then the current status of the touch sensor is maintained (e.g., off and no cursor control by motion) at 640. However, if the touch threshold is satisfied at 630, then at 650, the touch sensor can trigger at least one camera to turn on to begin watching and gathering data relating to a user's motions captured in the viewable space in the camera's view. Following at 660, the on-screen cursor can be driven and/or controlled by hand motion as long as the touch threshold continues to be satisfied. Thus, the threshold at 630 can continually be evaluated to determine when to turn the camera on or off.

Figure 7:
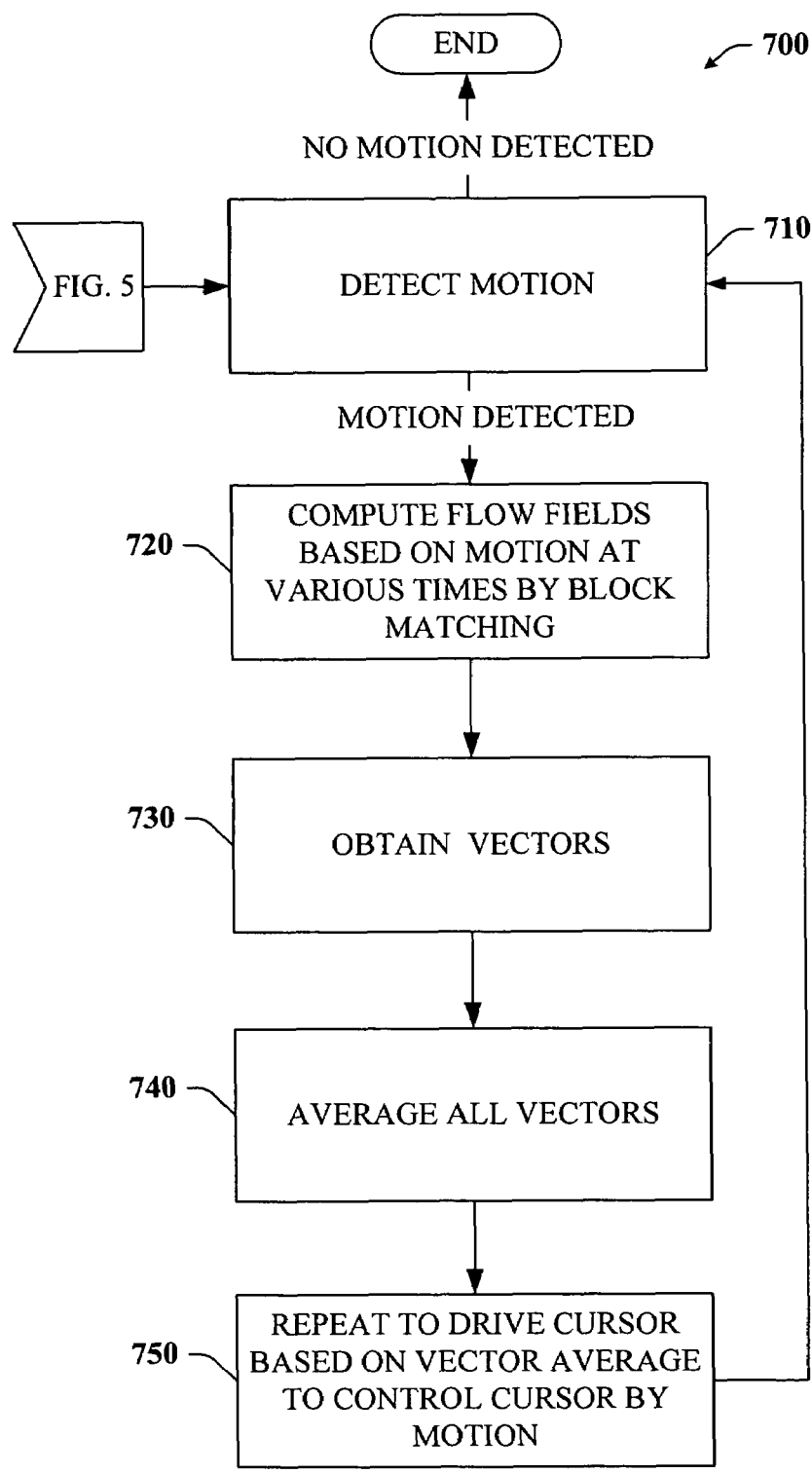
FIG. 7 is a flow diagram exemplary process that facilitates vision-based control in accordance with an aspect of the present invention.

Turning now to FIG. 7, there is illustrated a flow diagram of a process 700 that can be employed to control a cursor's relative position by user movements. Initially, the process 700 can be activated by a touch sensor such as depicted in FIG. 5. Proceeding therefrom, the process 700 involves detecting motion at 710. For instance, a user's hand movements made within a viewable space can be monitored in real-time and used to compute flow fields for various times t in real-time by way of block matching at 720. Each frame captured by a monitoring or detection component can be translated into a series of points to correspond to the position or image of a hand movement. Given at least two frames captured at two different times, the block matching performed at 720 can result in the obtaining of vectors at 730. Such vectors correspond to the movement of a point from one time or frame to another. Rather than tracking the hand, an average of substantially all the vectors can be calculated at 740. As a result, a smooth and stable estimate is obtained of substantially all the smaller noisy estimates.

Due to the unique properties of flow fields, they can be employed to recognize gestures (e.g., hand gestures) and then apply these gestures to other useful applications such as navigational control. For example, flow field gestures can be sensitive to finger position, left or right rotation (e.g., delta θ), upward or downward movements (e.g., delta y), left-to-right or right-to-left movements (e.g., delta x), depth of movements with respect to the screen or viewing plane (e.g., delta z), and/or speed of movements, (e.g., cursor position, page position, mouse acceleration profile, etc.).

When movement by both hands is captured, clustering operations can be performed on the generated flow field vectors to determine which movements can be disregarded. In addition, the fact that each hand handles objects with different motions can also be learned and applied to ascertain which hand movements to consider when controlling the cursor.

The above can be repeated to continue to drive the cursor according a user's gestures or movements at 750. However, if no motion is detected, then the process can be suspended or terminated until motion is detected again (assuming that the camera or other monitoring component is active).

Traditional tracking technologies typically rely on one or more particular points. Contrary to those techniques, the present invention can average the points generated in the flow field to obtain a grand estimate of the movement or position of the hand(s) to obtain a relative or absolute position of a cursor with respect to user-based movements. In addition, multiple estimates can be obtained to determine a more stable estimate of the mean.

Figure 8:
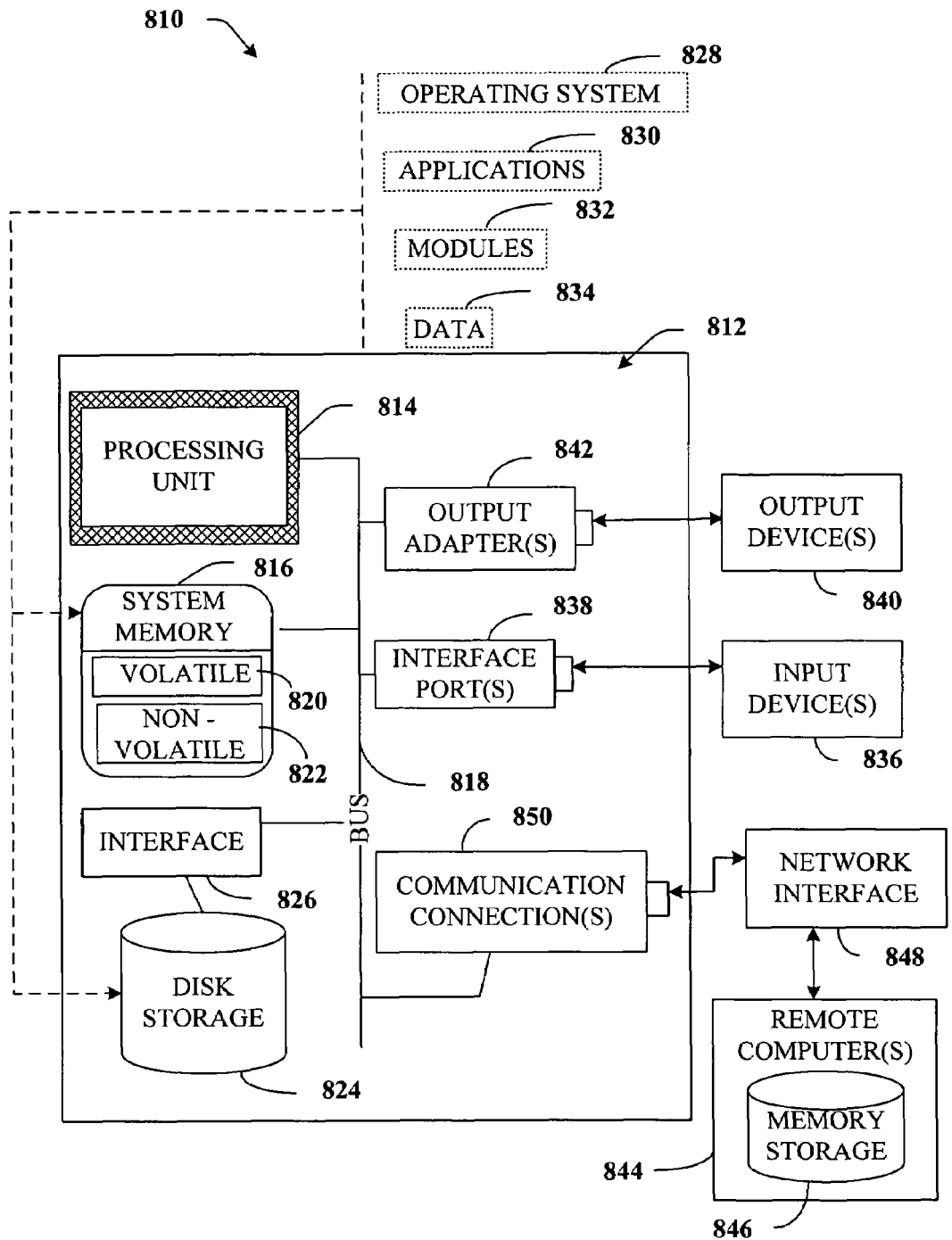
FIG. 8 illustrates an exemplary environment for implementing various aspects of the invention.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836.

Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vision-based navigation control system comprising:
    an input detection component that detects user input;
    an image monitoring component that receives data from the input detection component which causes the image monitoring component to turn on or off, wherein the data is an amount of capacitive discharge, the image monitoring component is turned on when the amount of capacitive discharge satisfies a threshold and the image monitoring component is turned off when the amount of capacitive discharge does not satisfy the threshold; and
    a navigational driving component that receives images captured by the image monitoring component to control position of a cursor; wherein controlling position of the cursor comprises:
        computing a plurality of flow fields based on images captured by the monitoring component to obtain a corresponding plurality of flow field vectors, wherein the images are a temporally consecutive sequence of image frames captured by the image monitoring component; and
        performing at least one of the following:
            averaging the plurality flow field vectors to ascertain a cursor position relative to a corresponding hand position, or
            averaging spatial positions of all non-zero flow field vectors to ascertain an absolute cursor position with respect to the corresponding hand position.

2. The system of claim 1, the input comprises at least one of a touch or pressure applied to the input component by a user.

3. The system of claim 1, the input detection component comprises a capacitive touch sensor that computes an electrical reading based in part on the user-based input.

4. The system of claim 1 further comprises software installed on a host machine that can read a status of the input detection component to determine whether an amount of user-based input satisfies a threshold.

5. The system of claim 1, the input detection component comprises an electrode that can be placed on a surface of an input component.

6. The system of claim 1, further comprising an input component including any one of: at least one button associated with a touchpad or mouse, and one or more keys of a keyboard.

7. The system of claim 1, the user-based input is convened to an electrical signal that is sensed or read by the detection component.

8. The system of claim 1, the image monitoring component comprises one or more cameras that can capture an image in motion frame by frame.

9. The system of claim 8 further comprising a component that computes flow fields for substantially every frame of an image captured by the image monitoring component in real-time.

10. The system of claim 9, the flow fields are generated to facilitate mapping the user-based input to coincide with controlling position of the cursor on a display screen to navigate through content.

11. The system of claim 9, the navigational driving component recognizes one or more gestures made by a user to determine where to position the cursor in real-time.

12. The system of claim 9, wherein the flow fields are generated by way of block matching to determine vectors that identify one or more directions of movement between at least any two frames of the image.

13. The system of claim 1, the image monitoring component is positioned to monitor the user's "visible" movement within a viewable space as determined in part by the dimensional limits of the monitoring component as well as in part by user preferences.

14. A computer readable medium having stored thereon the computer executable components of claim 1.

15. A vision-based method that facilitates cursor control comprising:
    detecting user-based input via a capacitive touch sensor;
    determining whether the input satisfies an amount of discharge threshold;

monitoring user hand gestures occurring within an image monitoring region when the touch threshold is satisfied;

driving cursor position based in part on the user hand gestures, wherein controlling cursor position comprises:

computing a plurality of flow fields based on images of the user hand gestures captured from the image monitoring region to obtain a corresponding plurality of flow field vectors, wherein the images are a temporally consecutive sequence of image frames: and performing at least one of the following:

averaging the plurality flow field vectors to ascertain a cursor position relative to a corresponding hand position of the user hand gestures, or averaging spatial positions of all non-zero flow field vectors to ascertain an absolute cursor position with respect to the corresponding hand position of the user hand gestures; and stopping monitoring of the image monitoring region when the touch threshold is no longer satisfied.

16. The method of claim 15, further comprising maintaining a current monitoring state depending on whether the touch threshold is satisfied.

17. The method of claim 15, the current monitoring state comprises one of: on or off.

18. The method of claim 15, wherein detecting user-based input and determining whether the touch threshold is satisfied on a continuous basis to ascertain when to monitor user hand gesture activity in the monitoring region.

19. The method of claim 15, the monitoring region comprises an area that is viewable by a monitoring component.

20. The method of claim 19, the monitoring component comprises a camera interfaced to a computing device.

21. The method of claim 15, further comprising converting the user hand gestures into relative cursor movement or position.

22. The method of claim 15, wherein the user hand gestures comprises one or more hand movements.

23. The method of claim 15, wherein determining whether a touch threshold is satisfied comprises analyzing charging and discharging of a capacitive touch sensor to determine if an amount of discharging is sufficient to constitute "touching".

24. A computer-vision based cursor control method comprising:

calculating an amount of discharge from a capacitive touch sensor;

activating an image monitoring component to monitor and detect hand gestures when the discharge satisfies a discharge threshold; and controlling cursor position with respect to content displayed on a user interface based on detected hand gestures, wherein controlling cursor position comprises:

computing a plurality of flow fields based on images captured by the monitoring component to obtain a corresponding plurality of flow field vectors, wherein the images are a temporally consecutive sequence of image frames captured by the image monitoring component; and performing at least one of the following:

averaging the plurality flow field vectors to ascertain a cursor position relative to a corresponding hand position; or averaging spatial positions of all non-zero flow field vectors to ascertain an absolute cursor position with respect to the corresponding hand position.

25. A vision-based navigation control system comprising:

means for detecting user-based input;

means for determining whether the input satisfies an amount of discharge touch threshold;

means for monitoring user gestures occurring within an image monitoring region when the touch threshold is satisfied; and means for driving cursor movement based in part on the user hand gestures, wherein driving cursor movement comprises: computing a plurality of flow fields based on images captured during the monitoring of user gestures to obtain a corresponding plurality of flow field vectors, wherein the images are a temporally consecutive sequence of image frames; and performing at least one of averaging the plurality of flow field vectors to ascertain a cursor position relative to a corresponding hand position or averaging spatial positions of all non-zero flow field vectors to ascertain an absolute cursor position with respect to the corresponding hand position.

26. The system of claim 25, further comprising means for maintaining a current monitoring state depending on whether the touch threshold is satisfied.

27. The system of claim 25, further comprising means for converting user gestures into relative cursor movement or position, the user gestures comprising one or more hand movements.

* * * * *